(12) United States Patent
Cavallaro et al.

(10) Patent No.: US 12,262,348 B2
(45) Date of Patent: *Mar. 25, 2025

(54) ALERT PERIPHERAL FOR NOTIFICATION OF EVENTS OCCURRING ON A PROGRAMMABLE USER EQUIPMENT WITH COMMUNICATION CAPABILITIES

(71) Applicant: Google Technology Holdings LLC, Mountain View, CA (US)

(72) Inventors: Alberto R. Cavallaro, Northbrook, IL (US); Martin R. Pais, North Barrington, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,493

(22) Filed: Aug. 14, 2023

(65) Prior Publication Data

US 2023/0388969 A1 Nov. 30, 2023

Related U.S. Application Data

(63) Continuation of application No. 17/856,165, filed on Jul. 1, 2022, now Pat. No. 11,729,743, which is a
(Continued)

(51) Int. Cl.
*H04W 68/02* (2009.01)
*H04B 1/3827* (2015.01)
(Continued)

(52) U.S. Cl.
CPC ............ *H04W 68/02* (2013.01); *H04B 1/385* (2013.01); *H04M 1/72412* (2021.01);
(Continued)

(58) Field of Classification Search
CPC ........... H04B 1/385; H04B 2001/3861; H04M 1/7253; H04M 2250/02; H04M 19/04; H04W 4/12
(Continued)

(56) References Cited

U.S. PATENT DOCUMENTS

| | | | |
|---|---|---|---|
| 5,861,797 A * | 1/1999 | Becker ................... | G04G 11/00 368/230 |
| 6,192,253 B1 * | 2/2001 | Charlier ................. | H04B 1/385 455/340 |

(Continued)

FOREIGN PATENT DOCUMENTS

| | | | |
|---|---|---|---|
| CN | 104729100 A | * | 6/2015 |
| CN | 105869345 | | 8/2016 |

(Continued)

OTHER PUBLICATIONS

International Search Report and Written Opinion dated Mar. 6, 2014 in International Patent Application No. PCT/US2014/018529.
(Continued)

*Primary Examiner* — Charles T Shedrick
(74) *Attorney, Agent, or Firm* — Brake Hughes Bellermann LLP

(57) ABSTRACT

An alert peripheral device that provides sensory notification to a user of the device includes: a power subsystem; a communication mechanism by which notification signals is received from a first user equipment (UE) that generates and transmits the notification signals in response to detection of specific events at the first UE; and a response notification mechanism that provides a sensory response of the peripheral device following receipt of a notification of a detected event (NDE) signal. The device further includes an embedded controller coupled to each of the other components and which includes firmware that when executed on the embedded controller configures the embedded controller to: estab-
(Continued)

lish a communication link between the communication mechanism and the first UE; and in response to detecting a receipt of the NDE signal from the first UE, trigger the response notification mechanism to exhibit the sensory response.

18 Claims, 6 Drawing Sheets

Related U.S. Application Data continuation of application No. 16/858,958, filed on Apr. 27, 2020, now Pat. No. 11,382,063, which is a continuation of application No. 16/034,940, filed on Jul. 13, 2018, now Pat. No. 10,638,450, which is a continuation of application No. 15/269,724, filed on Sep. 19, 2016, now Pat. No. 10,028,248, which is a continuation of application No. 14/988,416, filed on Jan. 5, 2016, now Pat. No. 9,451,426, which is a continuation of application No. 13/803,730, filed on Mar. 14, 2013, now Pat. No. 9,247,399.

(51) Int. Cl.
　　*H04M 1/72412*　　(2021.01)
　　*H04M 19/04*　　(2006.01)
　　*H04W 4/12*　　(2009.01)
　　*H04W 4/14*　　(2009.01)
　　*H04W 76/14*　　(2018.01)
　　*H04W 76/40*　　(2018.01)

(52) U.S. Cl.
　　CPC .............. *H04M 19/04* (2013.01); *H04W 4/12* (2013.01); *H04W 4/14* (2013.01); *H04W 76/14* (2018.02); *H04W 76/40* (2018.02); *H04B 2001/3861* (2013.01); *H04M 2250/02* (2013.01)

(58) Field of Classification Search
　　USPC ............... 455/418, 41.1, 556.1, 566, 567
　　See application file for complete search history.

(56) References Cited

U.S. PATENT DOCUMENTS

| | | | | |
|---|---|---|---|---|
| 6,263,218 B1* | 7/2001 | Kita | .............. | H04M 19/04 455/67.11 |
| 6,344,795 B1* | 2/2002 | Gehlot | .............. | G08B 6/00 340/407.1 |
| 6,567,785 B2* | 5/2003 | Clendenon | .............. | G06Q 10/109 705/7.42 |
| 6,839,305 B2* | 1/2005 | Perlman | .............. | G04G 15/006 368/278 |
| 9,363,314 B2 | 6/2016 | Foti | | |
| 9,786,142 B2* | 10/2017 | Jenkins | .............. | G08B 21/0216 |
| 10,652,728 B1 | 5/2020 | Guday et al. | | |
| 2005/0134562 A1* | 6/2005 | Grant | .............. | G06F 3/016 345/161 |
| 2005/0266891 A1* | 12/2005 | Mullen | .............. | G04G 21/04 455/567 |
| 2006/0152373 A1* | 7/2006 | King | .............. | A61B 5/0022 340/539.1 |
| 2006/0206833 A1* | 9/2006 | Capper | .............. | H04M 1/72427 715/205 |
| 2007/0054245 A1* | 3/2007 | Greenfield | .............. | G09B 5/14 434/112 |
| 2007/0076530 A1* | 4/2007 | Robinett | .............. | G04F 1/005 368/107 |
| 2007/0080812 A1* | 4/2007 | Perlman | .............. | A61B 5/6838 340/573.1 |
| 2008/0117166 A1* | 5/2008 | Rosenberg | .............. | F41B 15/04 345/156 |
| 2008/0227065 A1* | 9/2008 | Hamway | .............. | G09B 5/14 434/236 |
| 2008/0268780 A1* | 10/2008 | Werner | .............. | H04M 1/72412 455/90.3 |
| 2009/0072955 A1* | 3/2009 | Cary | .............. | G08B 6/00 340/407.1 |
| 2010/0090564 A1* | 4/2010 | Oh | .............. | H04M 1/67 310/328 |
| 2010/0227556 A1* | 9/2010 | Kim | .............. | H04W 4/08 455/41.2 |
| 2011/0028126 A1 | 2/2011 | Lim et al. | | |
| 2011/0059769 A1* | 3/2011 | Brunolli | .............. | H04M 1/72448 455/556.1 |
| 2011/0075835 A1* | 3/2011 | Hill | .............. | G06F 3/016 340/407.1 |
| 2011/0171937 A1* | 7/2011 | Hill | .............. | H04B 5/48 455/412.2 |
| 2011/0300804 A1* | 12/2011 | Lu | .............. | H04M 19/04 398/118 |
| 2012/0052922 A1* | 3/2012 | Li | .............. | H04M 19/04 455/567 |
| 2012/0084467 A1 | 4/2012 | Birnbaum et al. | | |
| 2012/0194976 A1* | 8/2012 | Golko | .............. | G06F 3/016 361/679.01 |
| 2012/0244503 A1* | 9/2012 | Neveldine | .............. | G09B 19/00 434/236 |
| 2013/0045761 A1 | 2/2013 | Grant et al. | | |
| 2014/0043276 A1* | 2/2014 | Takenaka | .............. | A63F 13/218 345/173 |
| 2014/0128063 A1 | 5/2014 | Chhabra | | |
| 2014/0156082 A1 | 6/2014 | Ma | | |
| 2015/0145656 A1 | 5/2015 | Levesque et al. | | |
| 2015/0237496 A1 | 8/2015 | Gao et al. | | |
| 2015/0324049 A1 | 11/2015 | Kies et al. | | |
| 2016/0036476 A1 | 2/2016 | Cho et al. | | |
| 2016/0050557 A1 | 2/2016 | Park et al. | | |
| 2016/0088465 A1 | 3/2016 | Golla | | |
| 2016/0330608 A1 | 11/2016 | Benn | | |
| 2016/0343218 A1* | 11/2016 | Jenkins | .............. | G08B 13/1427 |
| 2016/0374134 A1 | 12/2016 | Kweon et al. | | |
| 2017/0038847 A1 | 2/2017 | Schorsch et al. | | |
| 2017/0064572 A1 | 3/2017 | Subramanian et al. | | |
| 2017/0172424 A1* | 6/2017 | Eggers | .............. | A61B 8/488 |
| 2017/0289790 A1 | 10/2017 | Singh et al. | | |
| 2018/0288560 A1 | 10/2018 | Naik et al. | | |
| 2019/0141518 A1 | 5/2019 | Lin et al. | | |
| 2019/0357038 A1 | 11/2019 | Schouler | | |
| 2020/0059778 A1 | 2/2020 | Li et al. | | |

FOREIGN PATENT DOCUMENTS

| | | | | |
|---|---|---|---|---|
| CN | 105869345 A | * | 8/2016 | |
| CN | 104729100 | | 1/2018 | |
| WO | WO 2012001230 | | 1/2012 | |
| WO | WO 2016127936 | | 8/2016 | |
| WO | WO-2016127936 A1 | * | 8/2016 | ............. B23B 45/00 |

OTHER PUBLICATIONS

Koolertron LCD Bluetooth Vibrate Alert Bracelet Cellphone Wristwatch, last accessed Jan. 30, 2013, pp. 1-2, available at: http://www.amazon.com/Koolertron-Bluetooth-Bracelet-Cellphone-Wristwatch/dp/B004FOULAQ.

Motorola Haptics Core Team, "Local Haptics Recommendations for Morphing Keypads", In Mobile Devices Division, Feb. 19, 2007, pp. 1-25.

Notice of Allowance dated Mar. 3, 2022 in U.S. Appl. No. 16/858,958.

Notice of Allowance dated Mar. 15, 2018 in U.S. Appl. No. 15/269,724.

Notice of Allowance dated Mar. 22, 2023 in U.S. Appl. No. 17/856,165.

Notice of Allowance dated May 20, 2016 in U.S. Appl. No. 14/988,416.

(56) References Cited

OTHER PUBLICATIONS

Notice of Allowance dated Sep. 16, 2015 in U.S. Appl. No. 13/803,730.
Notice of Allowance dated Dec. 26, 2019 in U.S. Appl. No. 16/034,940.
Office Action dated Jan. 6, 2021 in U.S. Appl. No. 16/858,958.
Office Action dated Mar. 7, 2016 in U.S. Appl. No. 14/988,416.
Office Action dated Mar. 13, 2015 in U.S. Appl. No. 13/803,730.
Office Action dated Apr. 4, 2019 in U.S. Appl. No. 16/034,940.
Office Action dated Apr. 14, 2021 in U.S. Appl. No. 16/858,958.
Office Action dated May 19, 2017 in U.S. Appl. No. 15/269,724.
Office Action dated Jul. 23, 2021 in U.S. Appl. No. 16/858,958.
Office Action dated Aug. 7, 2019 in U.S. Appl. No. 16/034,940.
Office Action dated Aug. 21, 2017 in U.S. Appl. No. 15/269,724.
Office Action dated Aug. 31, 2020 in U.S. Appl. No. 16/858,958.
Office Action dated Sep. 20, 2018 in U.S. Appl. No. 16/034,940.
Office Action dated Nov. 3, 2016 in U.S. Appl. No. 15/269,724.
Office Action dated Nov. 12, 2021 in U.S. Appl. No. 16/858,958.
Office Action dated Dec. 13, 2022 in U.S. Appl. No. 17/856,165.

* cited by examiner

ALERT PERIPHERAL FOR NOTIFICATION OF EVENTS OCCURRING ON A PROGRAMMABLE USER EQUIPMENT WITH COMMUNICATION CAPABILITIES

CROSS-REFERENCE TO RELATED APPLICATIONS

This application is a continuation of U.S. patent application Ser. No. 17/856,165, filed Jul. 1, 2022, which is a continuation of U.S. patent application Ser. No. 16/858,958, filed Apr. 27, 2020, which is a continuation of U.S. patent application Ser. No. 16/034,940 filed Jul. 13, 2018, which is a continuation of U.S. patent application Ser. No. 15/269,724, filed Sep. 19, 2016, which is a continuation of U.S. patent application Ser. No. 14/988,416, filed Jan. 5, 2016, which is a continuation of U.S. patent application Ser. No. 13/803,730, filed Mar. 14, 2013, each of which is hereby incorporated by reference herein in its entirety.

TECHNICAL FIELD

The present disclosure generally relates to electronic peripherals and in particular to wearable electronic peripherals that can communicatively connect with a user equipment (UE). Still more particularly, the present disclosure relates to wearable electronic peripherals that provide alerts of events occurring on a communicatively-connected UE.

DESCRIPTION OF THE RELATED ART

Personal electronic devices or user equipment (UE), such as smart phones, tablets, e-readers, personal digital assistants (PDAs), and others are widely utilized. These UEs can generally be programmed to track and report on the pending status or occurrence of certain events, including calendared events on an electronic calendar or scheduled alarms on a timer of the UE. Other trackable events can include opening of certain programs on the UE, reaching specific pre-set milestones, receiving emails and/or text messages, detecting incoming calls, missed calls, and/or voicemails, completion of an automated (or a manual) task on the UE, e.g., downloading an application, and others. When one or more of these trackable events are completed, the UE can be programmed to provide a user notification in the form of a beep or ring, or other notification type. However, the user is required to be in proximity of the UE in order to become aware of the notification. Often, a user of the UE puts the UE down, places the UE in a case of bag, and/or moves away from the location of the UE, such that the user does not receive and/or is unaware of the notification that indicates that the specific event is occurring or is scheduled to occur.

Most users or owners of these UEs typically also wear articles of clothing or accessories such as jewelry, watches, headbands, eye glasses, Bluetooth® headsets, etc. Some of these accessories are a common part of the user's attire and/or "look". These items are also located on the user as opposed to the UEs, which can be left in the car, office, bag, or elsewhere, where the UE is out of the user's sensory space.

BRIEF DESCRIPTION OF THE DRAWINGS

The disclosure will best be understood by reference to the following detailed description of illustrative embodiments when read in conjunction with the accompanying drawings, wherein.

DETAILED DESCRIPTION

Figure 1:
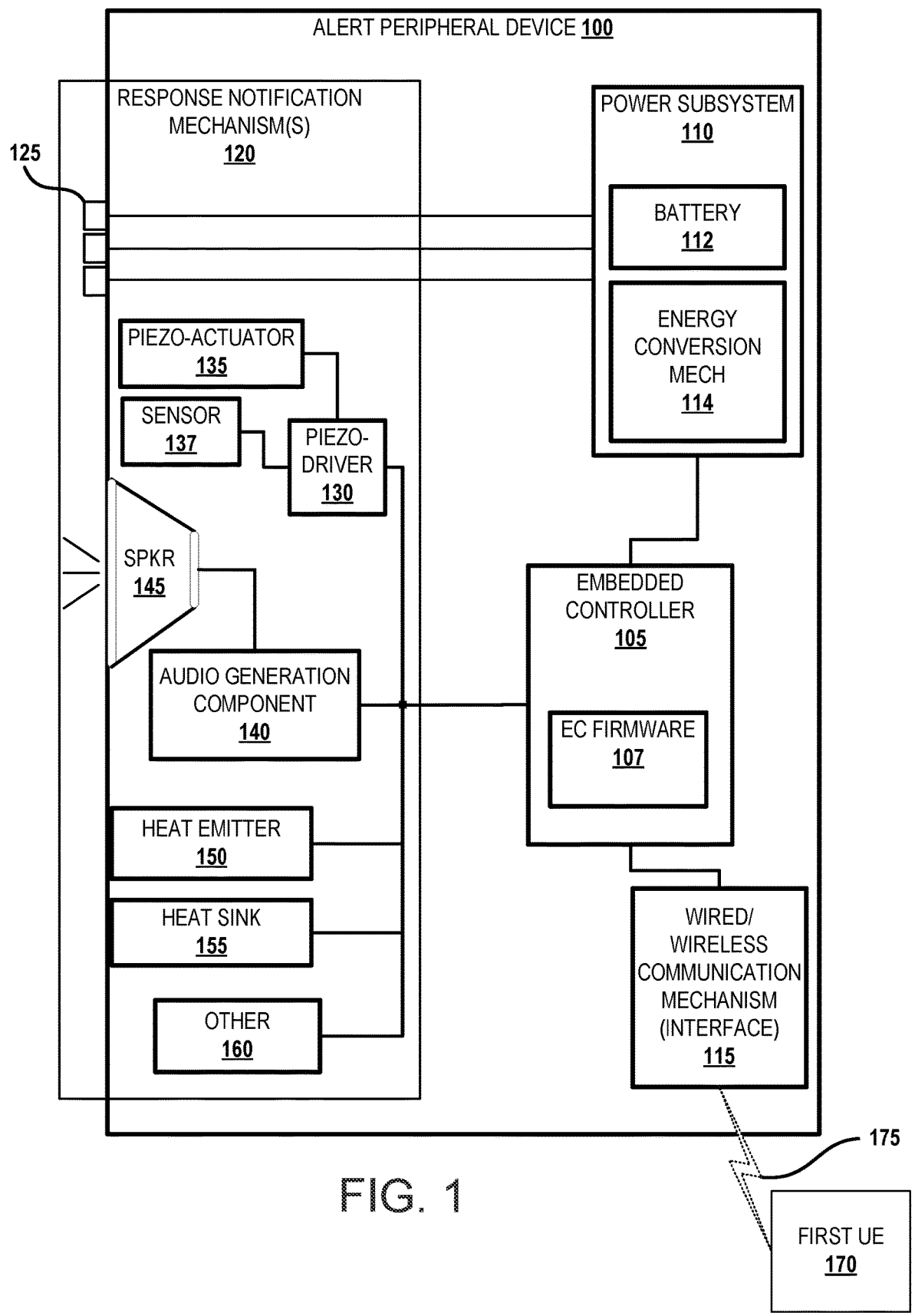
FIG. 1 provides a block diagram representation of an example alert peripheral device configured with various functional components that enable one or more of the described features of the disclosure, according to one or more embodiments.

The illustrative embodiments of the present disclosure provide one or more configurations of an alert peripheral device that provides one or more sensory notification(s) to a user of the alert peripheral device of an event occurring on a user equipment (UE) to which the alert peripheral device is communicatively connected. The alert peripheral device includes: a power subsystem that supplies power to the peripheral device; a communication mechanism by which notification signals is received by the peripheral device from a first UE that generates and transmits the notification signals in response to detection of specific events at the first UE; and a response notification mechanism that provides a sensory response of the peripheral device following receipt of a "notification of a detected event" (NDE) signal. The alert peripheral device further includes an embedded controller coupled to each of the power subsystem, the communication mechanism, and the response notification mechanism. The embedded controller includes firmware that when executed on the embedded controller configures the embedded controller to: establish a communication link between the communication mechanism and the first UE; and in response to detecting a receipt of the NDE signal from the first UE, trigger the response notification mechanism to exhibit the sensory response According to one aspect, the peripheral device is attached to one of a second user equipment, user apparel, jewelry, and/or other accessory that is worn by the user in a location relative to a sensory organ of the user at which a sensory notification emanating from the peripheral device can be detected by the user. Also, the response notification mechanism provides at least one of a tactile response, a thermal response, a visual response, and an auditory response following receipt of the NDE signal. Further, the firmware that triggers the response notification mechanism comprises firmware that configures the embedded controller to generate and forward a trigger signal to a component of the peripheral device responsible for exhibiting a respective one of the tactile response, the thermal response, the visual response, and the auditory response.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

Turning now to FIG. 1, there is depicted a block diagram representation of an example alert peripheral device configured with various functional components that enable one or more of the described features of the disclosure, according to one or more embodiments. Alert peripheral device (APD) 100 includes an embedded controller (EC) 105 communicatively coupled to a power subsystem 110, communication mechanism 115, and one or more response notification mechanisms 120. EC 105 includes EC firmware 107 that executes on EC 105 to trigger the various notification functions described herein. Power subsystem 110 supplies power to the components of the peripheral device. Power subsystem 110 is coupled via a power distribution system of wires (not shown) to each of the plurality of components within APD 100 and can be controlled by EC 105 to provide power to specific ones of the components, as needed. In the illustrative embodiment, power subsystem 110 includes a battery 112 and an energy conversion mechanism 114. Battery 112 can be a rechargeable battery, in one or more embodiments. Energy conversion mechanism 114 can be any one of a plurality of devices, including, without limitation, a thermopile, a near field communication charger, a solar converter, a motion-to-energy converter, and an external power charging connector.

Communication mechanism 115 enables APD 100 to communicatively connect with and receive notification signals 175 from a user equipment (UE), such as first UE 170. The communication mechanism can support a wired or a wireless communication; however it is appreciated that the wireless communication allows for untethered use of the APD 100 separate from the first UE 170. As a device supporting wireless communication, the communication mechanism 115 can be at least one of a Bluetooth® receiver and a near field communication (NFC) receiver, in one or more embodiments.

As described in greater detail throughout the disclosure, communication mechanism enables the receipt of notification signals 175, which can be received by the APD 100 from a first UE 170 that generates and transmits the notification signals 175 in response to detection of specific events at the first UE. The received notification signal is referred to hereinafter as "notification of a detected event" (NDE) signal 175.

Response notification mechanism(s) 120 generally represents one or more notification devices or components that provide a sensory response (i.e., a response that can be sensed by the user or wearer of APD 100) of the APD 100 following receipt of a "notification of a detected event" (NDE) signal 175. As shown, among the possible response notification mechanism(s) 120 are at least one light source 125, which for purposes of the disclosure is presented as at least one light emitting diode (LED) and hereinafter referenced as LED 125. The light source/LED 125 can be affixed to or protruding from the external casing of the APD 100 and visible on the exterior. Additionally or alternatively, the response notification mechanism(s) 120 can include a piezo subsystem comprised of a piezo driver 130 coupled to one or both of a piezo-actuator 135 and a sensor 137. In one embodiment, the sensor 137 is a pressure sensor that can be utilized to stop the presentation by the APD 100 of a notification to the user. In one implementation, only a piezo driver 130 is provided, and the piezo driver 130 can then provide the functions of an actuator (providing a vibration/pressure pulse) and/or also function as a sensor to detect pressure. With the use of the piezo driver 130 and/or separate sensor 137, once the NDE signal 175 is received and the notification is actuated on APD 100, the user can simply press on the surface of the accessory, jewelry, clothing, etc. in/to which the APD is embedded or attached. The APD 100 on detecting the pressure will stop issuing the notification.

Additionally and/or alternatively to the aforementioned notification mechanisms, response notification mechanism(s) 120 can include a speaker and an audio generation component. Also, the response notification mechanism(s) 120 can also include at least one of (i) a heat emitter that increases its temperature above that of the proximate surroundings resulting in the user experiencing a heating sensation and (ii) a heat sink that decreases its temperature relative to its proximate surrounding resulting in the user experiencing a cooling sensation. In one embodiment, the functionality of the heat emitter and/or heat sink is achieved using a thermoelectric plate capable of increasing or decreasing the surface temperature by a few degrees, thus imparting a heating or cooling sensation to the user. In another embodiment, the thermoelectric generator can also be utilized to provide this heating and cooling function. One or more alternate embodiments can provide a general other 160 representing any one of multiple other types of notification mechanisms 120 that operate on similar principles as the specific mechanisms illustrated and described herein, without limitation.

Figure 2:
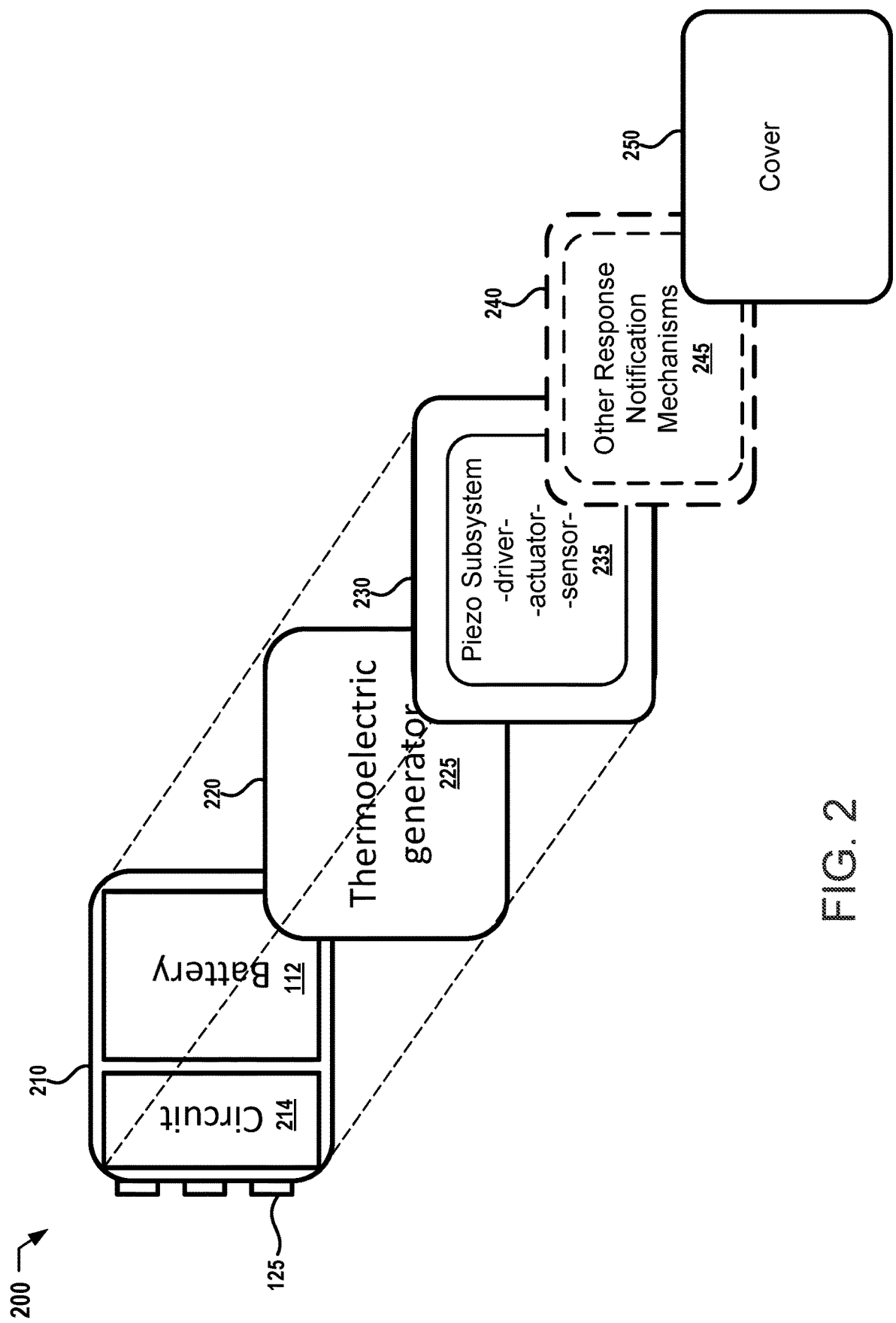
FIG. 2 provides a sliced schematic showing multiple layers of the example alert peripheral device, with functional layers identified, according to one embodiment.

FIG. 2 provides a sliced schematic showing multiple layers of the example alert peripheral device 200, with several functional layers identified, according to one embodiment. Five functional layers are presented; however, it is appreciated that the various layers can be all integrated on a single circuit board or chassis, in one embodiment, or be arranged in a different order and/or have a different number of functional layers, in other embodiments. The layered presentation is thus provided solely for illustration. FIG. 2 is described with reference to components and corresponding reference numerals presented in FIG. 1. First layer 210 includes the underlying circuit 214 and battery 112. The underlying circuit 214 can include the EC 105 and other components, such as communication mechanism 115, in one embodiment. Additionally, first layer 210 includes at least one light source, LED 125, with three such light sources illustrated. In one embodiment, each light source can represent a different color LED, and the specific LED that is illuminated can be correlated to a specific one of multiple different notification types supported by the APD 200. For example, the light sources may include a red, blue, and a yellow LED, with each color or combination of colors selected to represent a different notification. First layer 210 include a front or back cover which connects with a second cover (illustrated as fifth layer 250) to provide the exterior casing of the alert peripheral device 200.

Second layer 220 of APD 200 includes thermoelectric generator 225, which is a specific implementation of power energy conversion mechanism 114 (FIG. 1). Third layer 230 generally includes piezo subsystem 235, which can include a piezo driver 130, piezo actuator 135, and sensor 137 (FIG. 1). Fourth layer 240 includes other response notification mechanisms 245, which in one or more embodiments can include at least one of audio component 140 and speaker 145, heat emitter 150, heat sink 155, or other mechanism 160 (FIG. 1). Finally, fifth layer 250 is an external cover, which connects to cover portion of first layer 210 with all other layers sandwiched in between to collectively represent example APD 200. It is appreciated that one or more of the notification mechanism, e.g., the piezo actuator and/or piezo sensor, can be embedded in the cover (250) or other external casing of the APD 200 to allow for maximum sensory effect when the notification mechanism is activated.

Referring generally to FIGS. 1 and 2, as introduced above, the EC 105 of the alert peripheral device 100 further includes EC firmware 107. When executed, the EC firmware 107 configures the embedded controller to: establish a communication link between the communication mechanism 115 and the first UE 170; and in response to detecting a receipt of the NDE signal 175 from the first UE 170, trigger the response notification mechanism(s) 120 to exhibit the supported sensory response. Based on which of the notification mechanisms are supported by the APD 100, the EC 105 triggers the response notification mechanism(s) 120 to provide at least one of a tactile response, a thermal response, a visual response, and an auditory response, following receipt of the NDE signal 175. Accordingly, the EC firmware 107 triggering the response notification mechanism incudes the EC firmware 107 configuring the embedded controller 105 to generate and forward a trigger signal (not shown) to the specific component(s) of the response notification mechanisms 120 responsible for exhibiting a respective one of the tactile response, the thermal response, the visual response, and the auditory response.

According to a one embodiment in which the response notification mechanism 120 includes the at least one light source, the EC firmware 107 configures the embedded controller 105 to trigger the power subsystem 110 to provide power to the at least one light source (LED 125) to illuminate a portion of the alert peripheral device 100/200. In one or more alternate embodiments, the embedded controller 105 controls the LED 125 and the power subsystem 110 to provide a visual notification comprising one or more of: illumination of the LED 125; illumination of the LED 125 in one of a plurality of different colors, each indicative of a different notification parameter; and flickering of the LED 125.

In another embodiment, in which the response notification mechanism 120 includes a piezo subsystem having at least one of a piezo driver 130 and/or a piezo actuator 135, the EC firmware 107 configures the embedded controller 105 to trigger the piezo subsystem (i.e., the piezo driver 130 and/or the piezo actuator 135) to generate at least one of a pulse and a vibration of the alert peripheral device 100/200. In yet another embodiment, in which the response notification mechanism 120 includes an audio generation component 140 and speaker 145, the EC firmware 107 configures the embedded controller 105 to trigger the audio generation component 140 to generate and forward to the speaker 145 a specific audio that emanates from the peripheral device 100/200 as an audio notification. And, in one or more additional embodiments, where the response notification mechanism 120 can be a temperature controlling mechanism, such as a heat emitter 150 and/or a heat sink 155, the EC firmware 107 configures the embedded controller 105 to trigger the power subsystem 110 to perform one of (a) provide power to the heat emitter 150 to increase the sensed temperature of the heat emitter 150 and (b) activate the heat sink 155 to decrease the sensed temperature of the peripheral device 100/200 experienced by the user.

According to one aspect of the disclosure, the above introduced piezo subsystem further comprises a pressure sensor. Then, in response to detection via the pressure sensor of an application of external pressure on the alert peripheral device, the embedded controller 105 triggers a termination by the triggered sensory mechanism of the sensory response.

Figure 3:
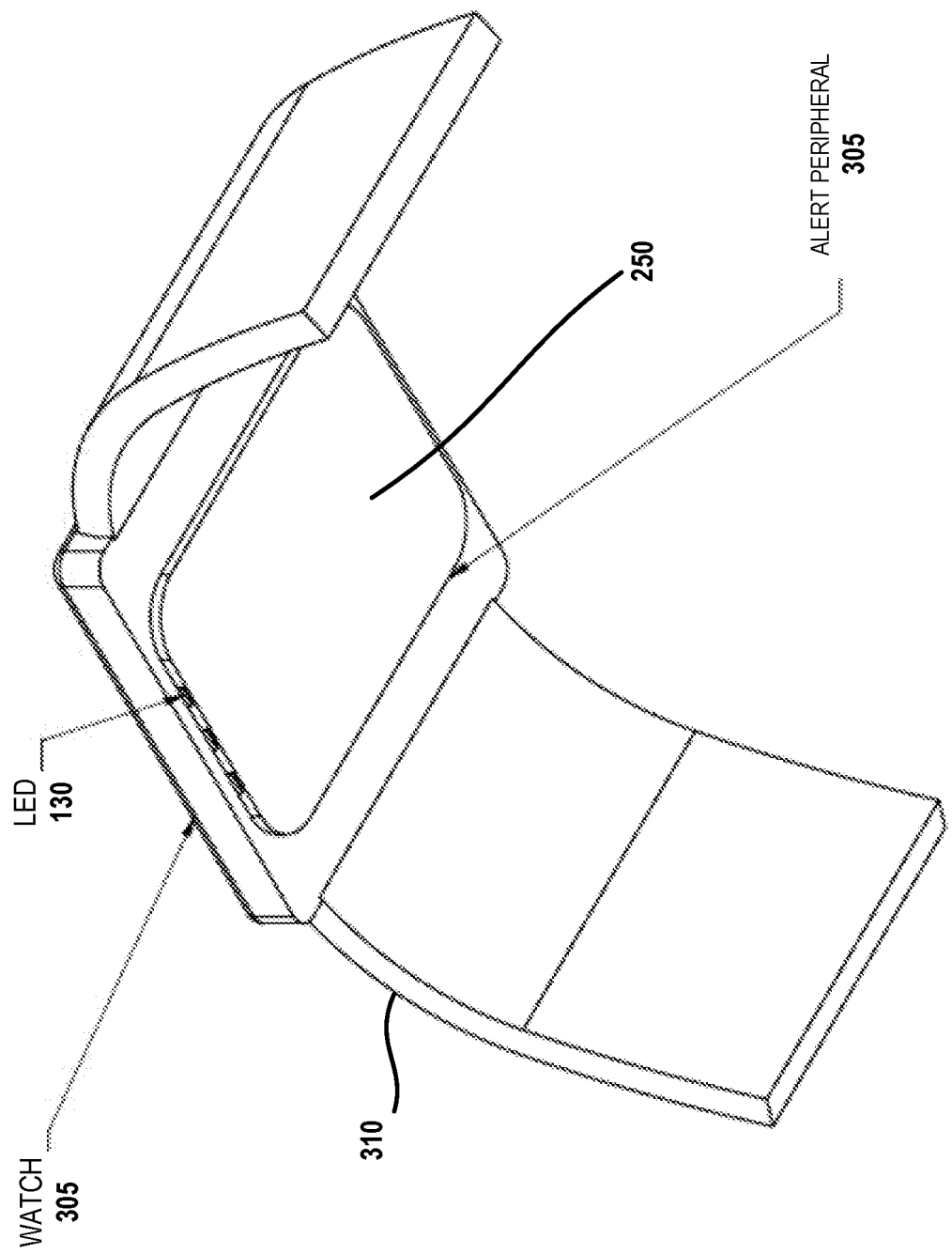
FIG. 3 illustrates an example wearable ecosystem on which the example alert peripheral device can be attached, according to one embodiment-.

According to one aspect of the disclosure, the APD 100/200 can be attached to one of a second UE, user apparel, an accessory, and/or jewelry. The item to which the APD 100/200 is attached can be one that is worn by the user in a location relative to a sensory organ of the user at which a specific sensory notification emanating from the peripheral device can be detected by the user. The type of sensory notification supported can also determine the configuration of the APD 100/200 as is the type of item to which the APD 100/200 is likely to be attached. In one implementation, as illustrated by FIG. 3, APD 100 can be attached to the back of a watch 305. FIG. 3 illustrates an example wearable ecosystem 300 on which the example peripheral device can be attached, according to one embodiments. In FIG. 3, which illustrates one possible ecosystem 300 in which the APD 100 can be utilized, wrist watch 305 includes a band 310 for securing the watch to the hand or wrist of the user. Watch also includes a face (not shown) and a back (partially shown). Alert peripheral device 100 is designed as a flat or thin electronics that can be attached to the back or rear surface of the wrist watch 305 without adding a significant amount of depth to the watch, such that the user of the watch 305 may not be immediately aware of the presence of APD 100. The exposed back cover 250 of APD 100 comes into contact with the skin of the user when the watch 305 is worn and the cover 250 can thus be utilized as the medium for transmitting pulses or vibrations (via piezo driver 130 or actuator 135) or heat and/or cool sensation (via heat emitter or heat sink), among other possible sensory notification types. As shown at the sides of APD 100, a plurality of LEDs 125 can also be illuminated, and the illumination would be visible on the hand of the user of the watch. Use of illumination as the notification mechanism can be triggered by a time of day or ambient light strength, in one embodiment, where the light source notification is triggered only when there is not an abundance of ambient light to mask the LED illumination. The sides of the APD or a porous portion of the cover 250 can also be utilized to provide audio output (such as a beep, buzz, ring, or other programmable response audio as the notification mechanism, in one or more embodiments.

In at least one embodiment, the APD 100/200 can be a separate user device that is carried or worn by a user of the first UE. In this embodiment, the APD 100/200 is not necessarily attached to another device. For example, the peripheral device can be made of flexible electronics, and is itself an accessory, such as a wrist bank or a wearable pin or broach.

Figure 5:
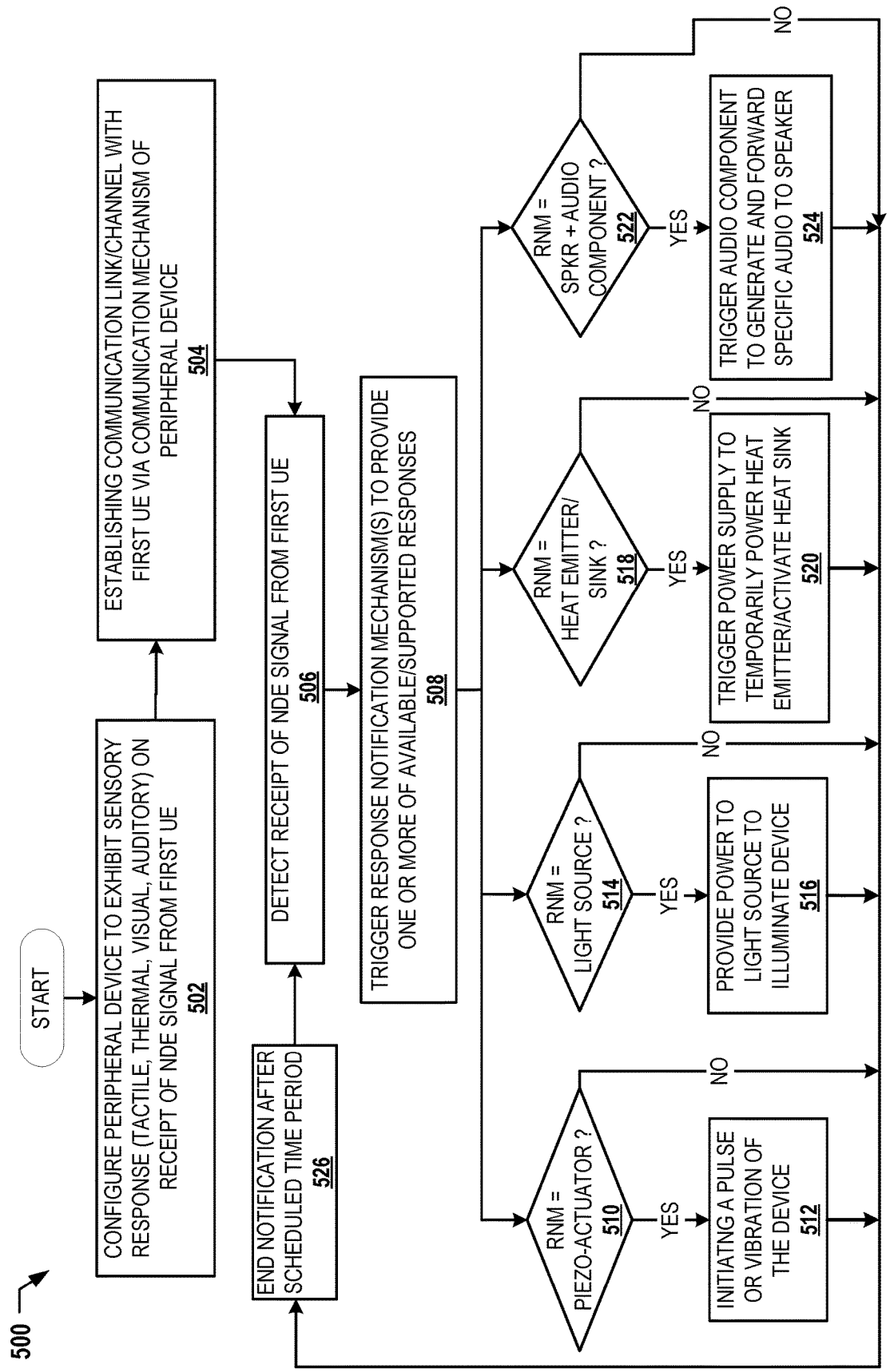
FIG. 5 is a flow chart illustrating a method by which the alert peripheral device responds to receive of a notification signal based on a configuration of the device, according to one or more embodiments.

FIG. 5 is a flow chart illustrating a method 500 by which the APD 100 responds to receive of a notification signal based on a configuration of the device, according to one or more embodiments. Method 500 enables user notification via APD 100 of events occurring on a first user equipment (UE) 170. Aspects of the method are described with specific reference to FIG. 1 and in particular the execution by the EC 105 of the EC firmware 107 on APD 100. The method begins at start block and proceeds to block 502 at which method 500 provides configuring the peripheral device to exhibit a sensory response, via a response notification mechanism, on receipt of a notification of a detected event (NDE) signal from the first UE. Method 500 then includes establishing a communication link between the peripheral device and the first UE via a communication mechanism (block 504), and then detecting receipt of an NDE signal from the first UE 170 (block 506). In response to detecting a receipt of the NDE signal, method 500 incudes triggering the appropriate response notification mechanism to provide the corresponding sensory response.

According to one or more embodiments, identifying the response notification mechanism(s) (RNM) involves a series of determinations, presented at blocks 510, 514, 518, and 522. In the illustrative embodiment, these determinations can be completed concurrently. At decision block 510, method includes determining whether the RNM includes a piezo actuator or piezo driver. In response to the peripheral device having a piezo-actuator as the response notification mechanism, method 500 includes providing the sensory response by initiating at least one or a pulse and a vibration of the peripheral device (block 512). At decision block 514, method includes determining whether the RNM includes a light source. In, response to the peripheral device having a light source as the response notification mechanism and a power source, method 500 includes providing the sensory response by providing power to the light source to illuminate a portion of the peripheral device (block 516). At decision block 518, method includes determining whether the RNM includes a heat sink or a heat emitter as the RNM. In response to the peripheral device having, as the response notification mechanism, one of (i) a heat sink that decreases its temperature below that of the proximate surroundings and (ii) a heat emitter that increases its temperature above that of the proximate surroundings and dissipates a resulting increase in heat energy into the proximate surroundings of the peripheral device, method 500 includes providing the sensory response by triggering the power subsystem to triggering heat dissipation from the heat sink to decrease the temperature of at least one of the heat sink and the peripheral device or provide power to the heat emitter to increase the ambient temperature of the heat emitter (block 520). Finally, at decision block 522, method 500 includes determining whether the RNM includes a speaker and an audio generation component. In response to the peripheral device having a speaker and an audio generation component as the response notification mechanism, method 500 includes providing the sensory response by triggering the audio generation component to generate and forward to the speaker a specific audio that emanates from the peripheral device (block 524). Once the notification is generated, method 500 further includes ending the notification after a pre-scheduled amount of time has elapsed (block 526). APD 100 then continues on the cycle of waiting for a receipt of a next NDE signal from the first UE (block 506).

Figure 4:
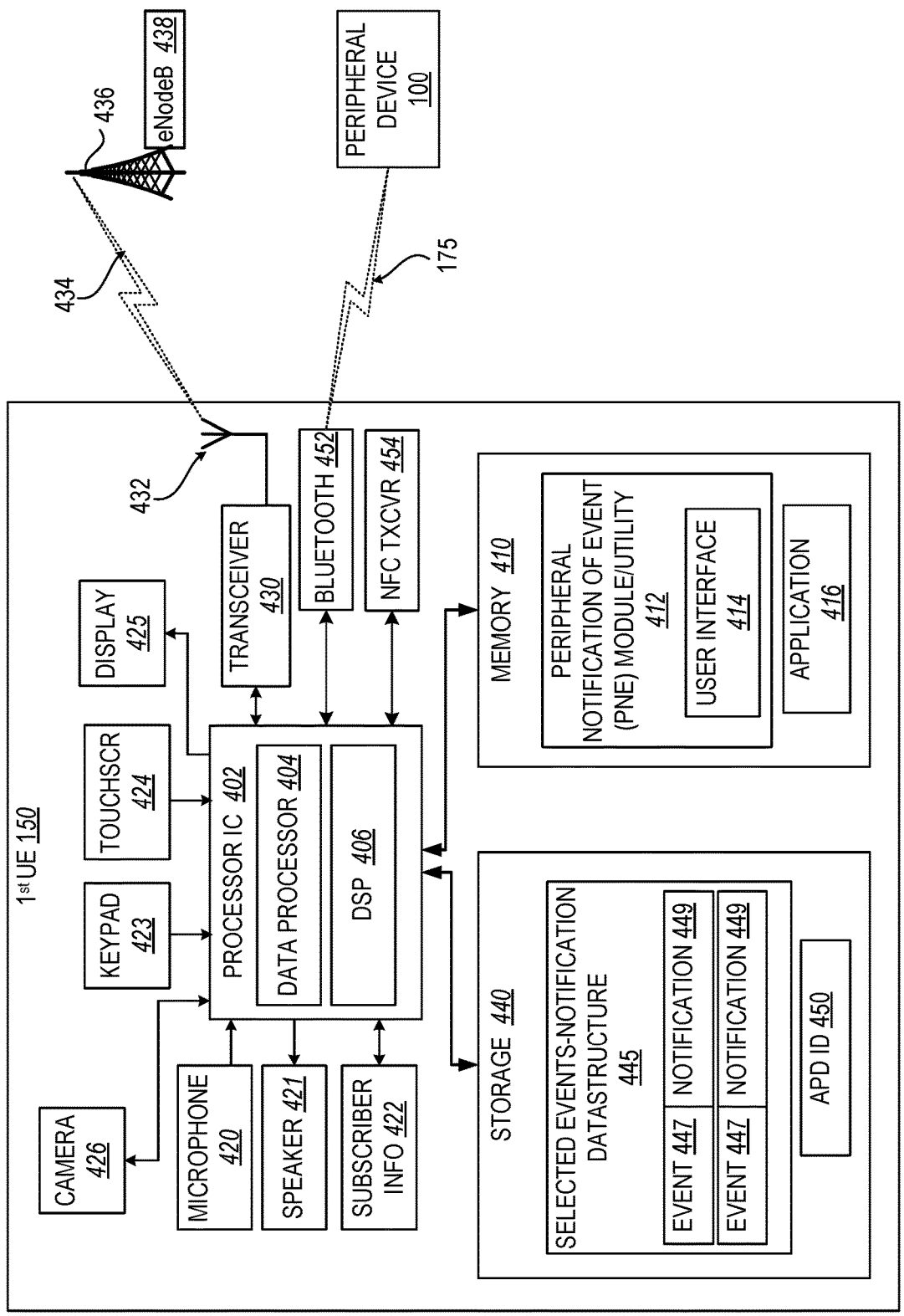
FIG. 4 illustrates an example communication device that operates as a first user equipment (UE), which provides notification signals to the peripheral component, in accordance with one or more embodiments.

Turning now to FIG. 4, there is illustrated example communication device that can be utilized as or provide the functionality associated with a first UE 170 that generates and forwards NDE signals 175 to the APD 100, according to one embodiment. In the described embodiments, the first UE 170 is a mobile communication device which is configured to generate and transmit an NDE signal 175 in response to an occurrence of one or more pre-programed events at the mobile communication device. According to the general illustration, as a mobile communication device, first UE (UE1) 170 is designed to communicate with other devices via one of a wireless communication network, generally represented by base station (evolution node B, eNodeB) 440 and antenna 442, and one or more pairing devices, e.g., Bluetooth® 452 and near field communication (NFC) device 454. UE1 170 can be one of a host of different types of devices, including but not limited to, a mobile cellular phone or smart-phone, a laptop, a net-book, an ultra-book, and/or a tablet computing device. These various devices all provide and/or include the necessary hardware and software to enable pairing of UE1 with a second UE, e.g., APD 100, or enable a one way communication of NDE signals 175 to APD 100. Additionally, UE1 170 includes the hardware and software to support the various wireless or wired communication functions.

Referring now to the specific component makeup and the associated functionality of the presented components, UE1 170 comprises processor integrated circuit (IC) 402, which connects via a plurality of bus interconnects (illustrated by the bi-directional arrows) to a plurality of functional components of UE1 170. Processor IC 402 can include one or more programmable microprocessors, such as a data processor 404 and a digital signal processor (DSP) 406, which may both be integrated into a single processing device, in some embodiments. The processor IC 402 controls the communication, image capture, and other functions and/or operations of UE1 170. These functions and/or operations thus include, but are not limited to, application data processing and signal processing.

Connected to processor IC 402 is memory 410, which can include volatile memory and/or non-volatile memory. One or more executable applications can be stored within memory for execution by data processor 404 on processor IC 402. For example, memory 410 is illustrated as containing peripheral notification of event (PNE) module or utility 412, which can include PNE user interface 414, and other application(s) 416. According to one or more embodiments, applications 416 generally represent one or more executable modules of UE1 150 that can generate the various events that are tracked by PNE utility 412. For example, application(s) 146 can include an electronic calendar, a timer, such as a stop watch or alarm, an email engine, a text messaging module, a voicemail module, and others. The associated functionality and/or usage of each of the PNE utility as it relates to detected events from these various application(s) 146 will be described in greater detail within the descriptions which follow. In particular, the functionality associated with and/or provided by PFE utility 412 and the other functional modules contained therein is described in greater detail with the description of FIG. 6. It is appreciated that the various software modules can be independent modules that communicate with each other via processor execution of respective code.

Also shown coupled to processor IC 402 is storage 450 which can be any type of available storage device capable of storing one or more application software and data. It is further appreciated that in one or more alternate embodiments, the device storage can actually be remote storage and not an integral part of the device itself. As provided, storage 450 contains a selected events and notification data structure 445, which includes pairings of specific events identified as being events of interest to PNE utility 412 with specific notifications 449 that should be triggered when the particular event 447 is detected or occurs on UE1 170. The specific usage and/or functionality associated with these components are described in greater detail in the following descriptions. As shown, in one embodiment, storage 440 also maintains a copy of the APD identifier (ID) 450 that allows PNE module 412 to know which APD 100 to transmit the notification to. It is further contemplated that, in one or more embodiments, multiple different APDs can be supported by a single UE, and that specific types of notifications may correspond to the particular APD to which the generated PNE signal is going to be sent.

UE1 170 can also comprise a plurality of input/output (I/O) devices, including one or more input devices, such as camera 420, microphone 421, touch screen and/or touch pad 422, keypad 423, and/or one or more output devices, such as display 425, speaker 426, and others. UE1 170 can also include a subscriber information module (SIM) 427 which can provide unique identification information of the subscriber that owns or utilizes UE1 170, as well as specific contacts and device settings associated with the particular subscriber. In order to allow UE1 170 to provide time data, UE1 170 also includes system clock 428.

According to one aspect of the disclosure and as illustrated by FIG. 4, UE1 170 supports at least one and potentially many forms of wireless, over-the-air communication, which allows UE1 170 to transmit and receive communication with at least one second device. As a device supporting wireless communication, UE1 170 can be one of, and be referred to as, a system, device, subscriber unit, subscriber station, mobile station (MS), mobile, mobile device, remote station, remote terminal, user terminal, terminal, communication device, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, such as a laptop, tablet, smart phone, personal digital assistant, or other processing devices connected to a wireless modem. To support the wireless communication, UE1 170 includes one or more communication components, including transceiver 430 with connected antenna 432, Bluetooth® transceiver 452 and near field communication transceiver module 454. Collectively, these wireless components provide a communication means or mechanism by which UE1 170 can communicate with other devices and networks. For purposes of the following illustrations and associated descriptions thereof, PNE signal 175 is described as being communicated via Bluetooth communication, supported by Bluetooth® transceiver 452, without limitation on the scope of the disclosure.

To support the mobile communication device aspects of UE1 170, the wireless communication can be via a standard wireless network, which includes a network of base stations, illustrated by evolution Node B (eNodeB) 440 and associated base station antenna 442. A first over-the-air signal 444 is illustrated interconnecting base station antenna 442 with local antenna 432 of UE1 170.

In addition to the above listing of general components, the specific implementation of the disclosure relevant to the operations that affect APD 100 provides a first UE 170 that includes: a processor 404; a communication mechanism (434) by which the user equipment can communicate with at least one peripheral device 100 configured with a communication receiving mechanism 115 and components that enable the peripheral device 100 to respond to specific notifications received from the user equipment 170; one or more applications 416 and firmware that execute on the processor 404 and which enable the user equipment 170 to operate and periodically generate events 447 that are detectable and which are pre-identified as events of interest for signaling to the peripheral component 100.

Figure 6:
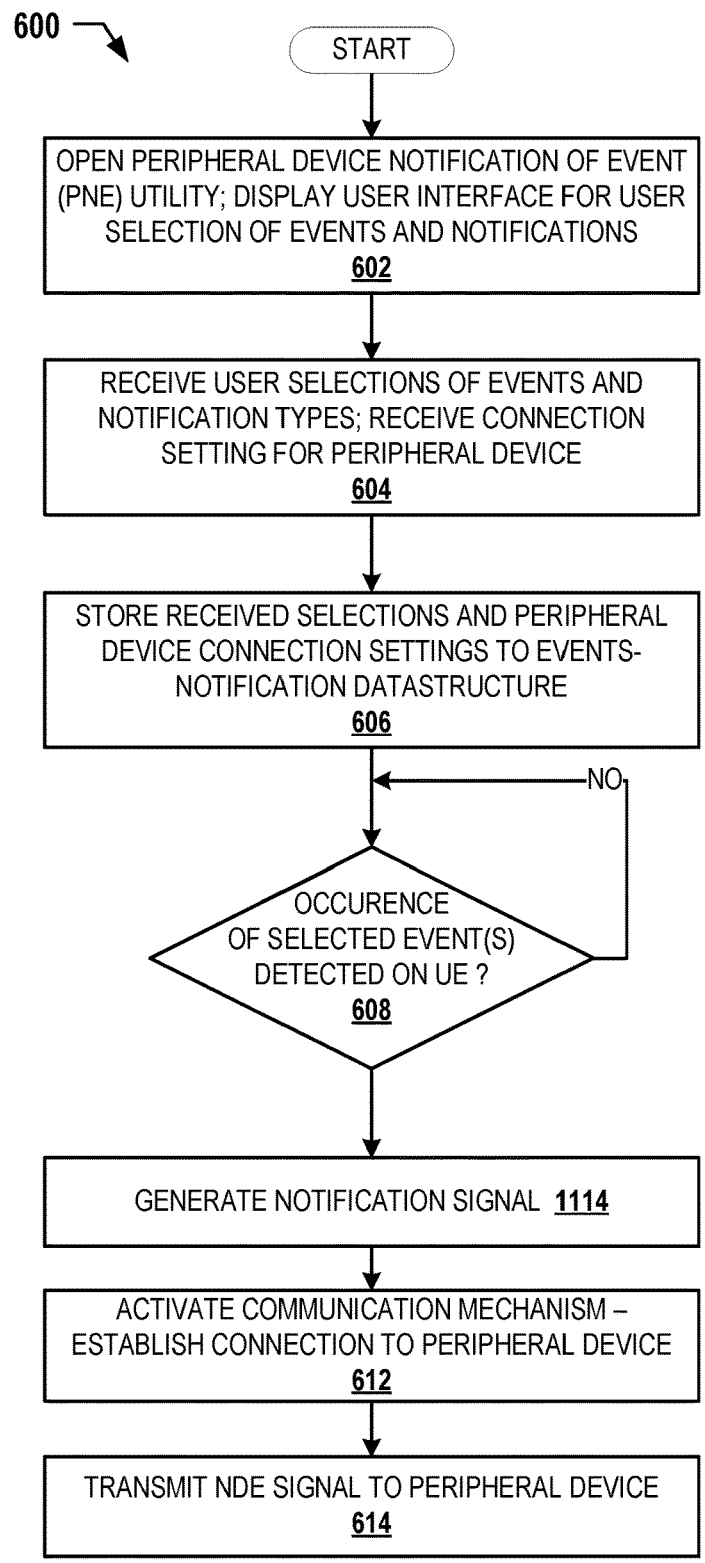
FIG. 6 is a flow chart illustrating a method by which a first UE is configured to utilize an alert peripheral device to provide notifications of an event occurring on the first UE, according to one or more embodiments.

Further, the first UE 170 includes a peripheral notification of event (PNE) module 412 that executes on the processor 404 and which configures the processor 404 to perform a series of functions associated with method 600 of FIG. 6. FIG. 6 is a flow chart illustrating a method by which first UE 170 is configured to utilize an alert peripheral device 100 to provide notifications of an event occurring on the first UE 100, according to one or more embodiments. Generally, method 600 can be described as being performed by one or more of UE1 100, processor 104, or processor execution of a specific utility, e.g., PNE utility 112, without limitation. Also, method 600 is described with reference to components and features of FIGS. 4, which provide specific illustrations of components described by method 600. Method 600 begins at start block and proceeds to block 602 at which PNE utility 412 is opened on the UE1 170. Once opened, the PNE utility 412 configures the processor 404 to generate and display a user interface 414 providing selectable options for identifying which events will trigger the generating of an NDE signal and at least one of (i) a type of NDE signal to generate and (ii) when to transit the generated NDE signal, and (iii) which communication medium to utilize to transmit the NDE signal. Method 600 then includes PNE utility 412 receiving user selections of events and notification types, as well as the connection settings and APD ID of the APD 100 (block 604). The user interface may also allow the user to specify how long the notification is to be transmitted to the APD 100, such that a time limit is provided on the notification feature. Method 600 then includes storing the received selections and settings to an events notification data structure 445.

With the selections stored, PNE utility 412 monitors for the occurrence of one of the selected events of interest. At decision block 608, method 600 determines whether one of the selected events has been detected on UE1 170. Method 600 then includes, in response to detecting an occurrence of an event 447 that is one of the pre-identified events of interest: generating a notification (449) of detected event (NDE) signal 175 (block 610); activating the communication mechanism (434) to connect to the peripheral device 100 (block 612); and transmitting the generated notification 449 (as NDE signal 175) to the identified alert peripheral device (e.g., APD 100) via the communication mechanism (434) (block 614).

In each of the flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A wearable alert device that provides notifications to a user of a mobile device, the wearable alert device comprising: a communication interface configured to receive one or more notification signals from the mobile device; an actuator configured to generate a feedback signal to the wearable alert device; and a controller communicatively coupled to the communication interface, wherein the controller is configured to: establish a communication link between the communication interface and the mobile device; receive user configuration settings indicating a manner in which an alert of a type of notification from a plurality of types of notification is to be presented via the actuator; in response to receiving a notification signal from the mobile device, determine, based on a type of notification associated with the notification signal and the user configuration settings, that the manner in which the alert is to be presented is haptic feedback; cause the haptic feedback corresponding to the alert to be presented to a wearer of the wearable alert device via the actuator; and detect pressure to receive a signal to stop the haptic feedback via the actuator.

2. The wearable alert device of claim 1, wherein the manner in which the alert of the type of notification is presented corresponds to a haptic pulse.

3. The wearable alert device of claim 1, wherein the manner in which the alert of the type of notification is presented corresponds to a haptic vibration.

4. The wearable alert device of claim 1, wherein the type of notification corresponds to an alarm notification.

5. The wearable alert device of claim 1, wherein the type of notification corresponds to a message received at the mobile device via a messaging application executing on the mobile device.

6. The wearable alert device of claim 1, wherein the user configuration settings are received via a user interface that includes a plurality of selectable options for associating a type of notification of the plurality of types of notification with a manner in which a corresponding alert is to be presented.

7. A method for providing notifications to a user of a mobile device, the method comprising:
- establishing a communication link between a communication interface configured to receive one or more notification signals from the mobile device and the mobile device;
- receiving user configuration settings indicating a manner in which an alert of a type of notification from a plurality of types of notification is to be presented via an actuator configured to generate a feedback signal to a wearable alert device;
- in response to receiving a notification signal from the mobile device, determining, based on a type of notification associated with the notification signal and the user configuration settings, that the manner in which the alert is to be presented is haptic feedback;
- causing the haptic feedback corresponding to the alert to be presented to a wearer of the wearable alert device via the actuator; and
- detecting pressure to receive a signal to stop the haptic feedback via the actuator.

8. The method of claim 7, wherein the manner in which the alert of the type of notification is presented corresponds to a haptic pulse.

9. The method of claim 7, wherein the manner in which the alert of the type of notification is presented corresponds to a haptic vibration.

10. The method of claim 7, wherein the type of notification corresponds to an alarm notification.

11. The method of claim 7, wherein the type of notification corresponds to a message received at the mobile device via a messaging application executing on the mobile device.

12. The method of claim 7, wherein the user configuration settings are received via a user interface that includes a plurality of selectable options for associating a type of notification of the plurality of types of notification with a manner in which a corresponding alert is to be presented.

13. A non-transitory computer-readable medium containing computer executable instructions that, when executed by a processor, cause the processor to perform a method for providing notifications to a user of a mobile device, the method comprising:
- establishing a communication link between a communication interface configured to receive one or more notification signals from the mobile device and the mobile device;
- receiving user configuration settings indicating a manner in which an alert of a type of notification from a plurality of types of notification is to be presented via an actuator configured to generate a feedback signal to a wearable alert device; in response to receiving a notification signal from the mobile device, determining, based on a type of notification associated with the notification signal and the user configuration settings, that the manner in which the alert is to be presented is haptic feedback; causing the haptic feedback corresponding to the alert to be presented to a wearer of the wearable alert device via the actuator; and detecting pressure to receive a signal to stop the haptic feedback via the actuator.

14. The non-transitory computer-readable medium of claim 13, wherein the manner in which the alert of the type of notification is presented corresponds to a haptic pulse.

15. The non-transitory computer-readable medium of claim 13, wherein the manner in which the alert of the type of notification is presented corresponds to a haptic vibration.

16. The non-transitory computer-readable medium of claim 13, wherein the type of notification corresponds to an alarm notification.

17. The non-transitory computer-readable medium of claim 13, wherein the type of notification corresponds to a message received at the mobile device via a messaging application executing on the mobile device.

18. The non-transitory computer-readable medium of claim 13, wherein the user configuration settings are received via a user interface that includes a plurality of selectable options for associating a type of notification of the plurality of types of notification with a manner in which a corresponding alert is to be presented.

* * * * *